Figure 3:
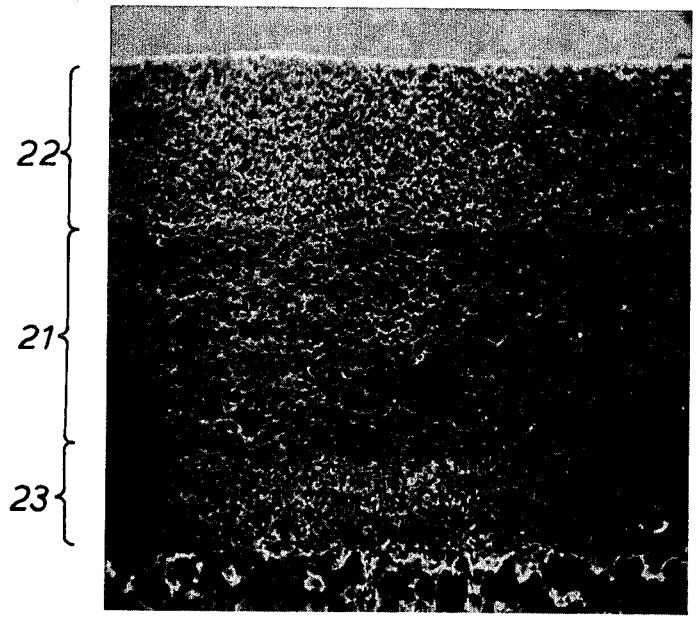
Figure 4:
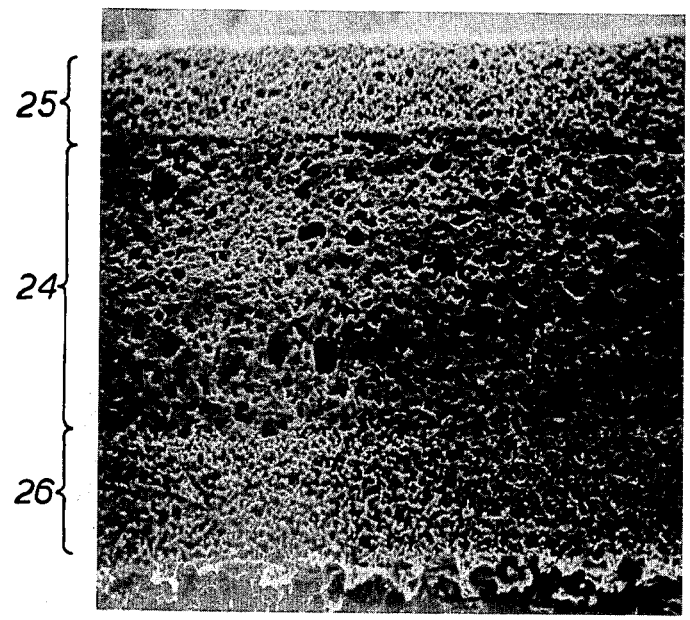
Figure 5:
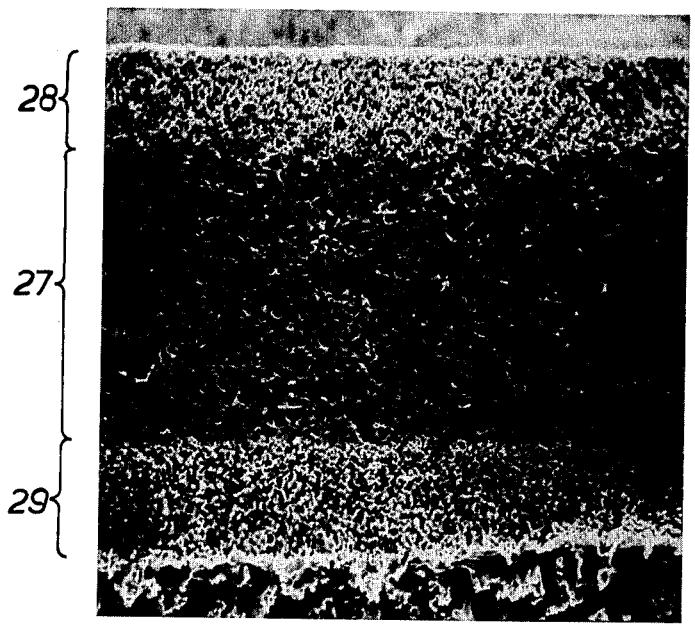
Figure 6:
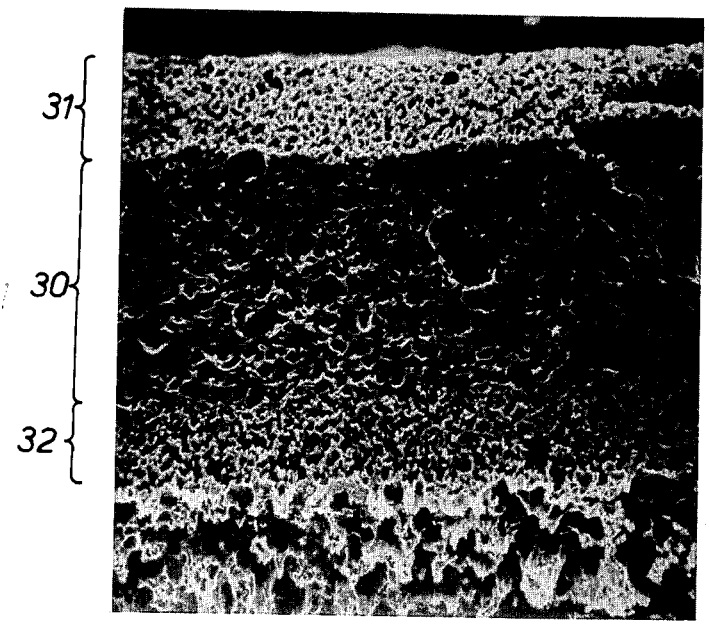
Figure 7:
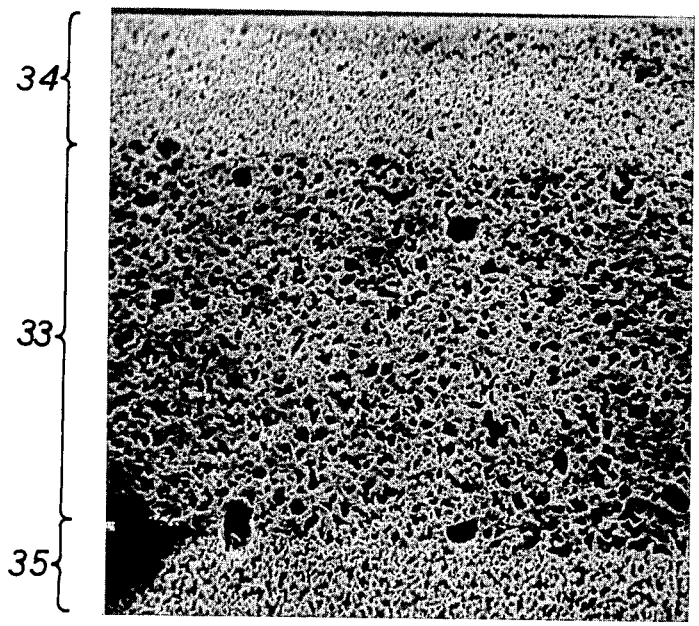
Figure 8:
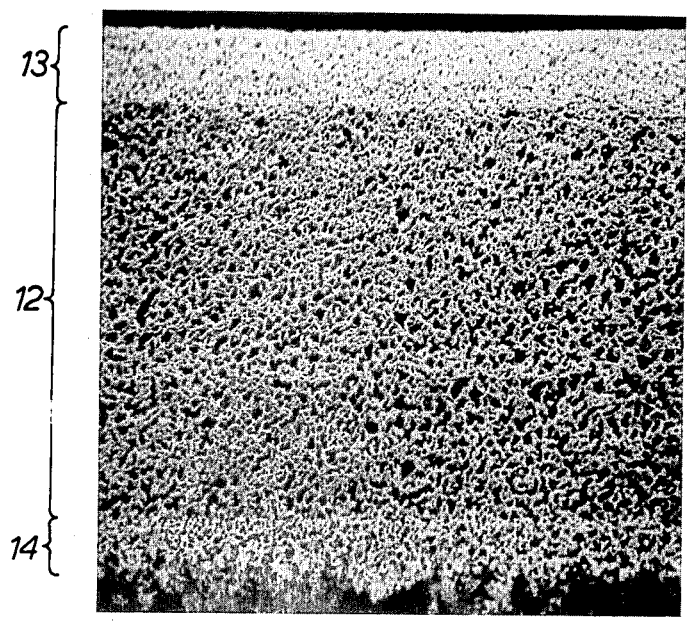

United States Patent [19]
Pearman et al.

[11] 3,968,292
[45] July 6, 1976

[54] WATER VAPOR PERMEABLE SHEET MATERIAL

[75] Inventors: Arthur William Pearman; Steven James Wright, both of King's Lynn, England

[73] Assignee: Porvair Limited, King's Lynn, England

[22] Filed: July 22, 1974

[21] Appl. No.: 490,402

[30] Foreign Application Priority Data
July 25, 1973   United Kingdom............35469/73

[52] U.S. Cl. .......................... 428/213; 260/2.5 AY; 264/49; 427/245; 427/246; 428/305; 428/330; 428/425; 428/904; 36/45

[51] Int. Cl.² ...................... D06N 7/04; B32B 3/00; B32B 7/02

[58] Field of Search...................... 161/159, DIG. 2; 428/213, 220, 305, 306, 904; 427/352, 407; 264/216; 36/45

[56] References Cited
UNITED STATES PATENTS

| | | | |
|---|---|---|---|
| 3,640,829 | 2/1972 | Elton | 161/159 |
| 3,791,997 | 2/1974 | Hathorn et al. | 161/160 |

*Primary Examiner*—William J. Van Balen
*Attorney, Agent, or Firm*—Abner Sheffer

[57] ABSTRACT

There is disclosed a water vapor permeable shoe upper material having at least three layers, the density, thickness and structure of the layers having a defined novel relationship whereby an improved cut tear to stiffness relationship is achieved.

16 Claims, 9 Drawing Figures

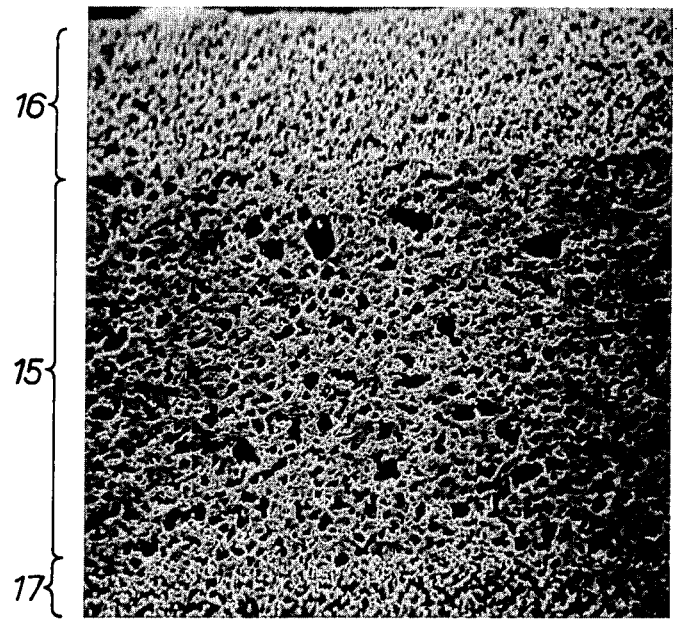
FIG. 1.  200 MICRONS
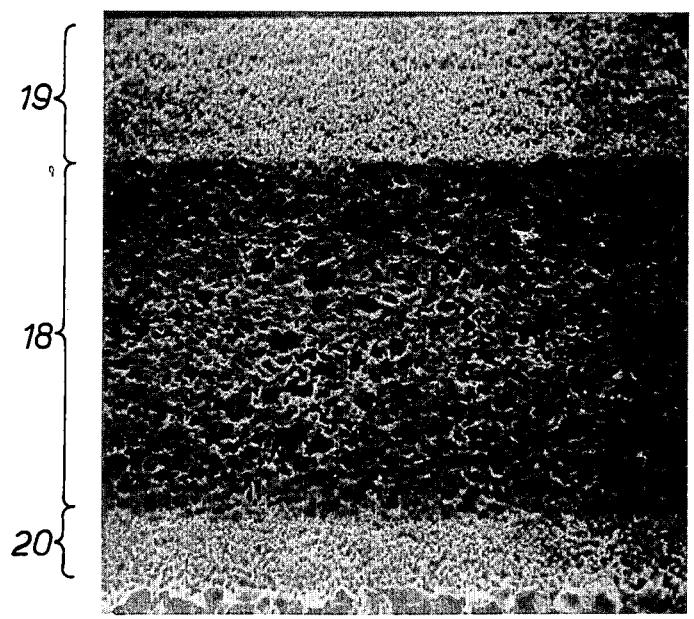
FIG. 2.

WATER VAPOR PERMEABLE SHEET MATERIAL

The present invention relates to water vapour permeable sheet materials. Such materials find many uses and in particular find use as shoe upper materials and clothing materials.

An excellent microporous polyurethane sheet material which is free from pre-formed fibrous reinforcement and which consists of a microporous strength imparting substrate layer about 1.35 mm. thick having a density of about 0.55 grams per square meter and having integrally attached to one face a thinner less dense surface layer is already known. The surface layer is typically about 0.35 mm. thick and has a density of about 0.35 grams per cc. The free surface of the surface layer is given a very thin surface finish.

This material has a good cut tear strength for fabrication into shoes and an adequate water vapour permeability prior to finishing so that after application of the finishing the product still has a sufficient water vapour permeability for use in shoe uppers. However, for certain uses the product is somewhat stiff. The stiffness of such a material could be reduced by reducing the thickness of the strength imparting substrate but we have found that this results in a product having inadequate tear strength and in addition a product below 1.5 mm. thick has inadequate substance for commercial use as a men's shoe upper.

Thus in these known materials the ratio of cut tear strength to stiffness (as defined herein) is usually about 2 to 3.4.

We have discovered that by reducing the thickness of the substrate layer and at the same time giving it a stronger structure and by forming a further surface layer (which will be termed herein the flesh layer), on the face of the substrate remote from the topcoat layer substantial reduction in stiffness can be achieved whilst maintaining adequate tear strength and water vapour permeability and product thickness.

It is thus an object of the present invention to produce water vapour permeable materials free from fibrous reinforcement having ratios of cut tear strength to stiffness in excess of 4 and desirably in excess of 5.

U.S. Pat. No. 3,284,274 discloses that in making manmade suedes and smooth surface leather-like materials for shoe uppers a layer of cellular honeycomb like macroporous polymer material may be applied to both sides of a flexible porous substrate which can be a sheet of non-fibrous porous polymeric material such as a tough microporous film.

We have found that unless the substrate is made both denser and thicker than either the fleshcoat layer or the topcoat layer the desirable improvement in the ratio of cut tear strength to stiffness is not obtained.

Thus according to the present invention a water vapour permeable soft flexible sheet material suitable for use as the upper of a shoe in place of leather is at least 0.8 mm. e.g., 1.0 – 2.0 or 0.9 – 1.7 mm thick and has at least three superimposed porous layers of elastomeric polymer the material being free from fibrous reinforcement and having an elongation at break in excess of 200% and comprises a strength imparting porous elastomeric polymer substrate layer disposed between a porous elastomeric polymer fleshcoat layer and a porous elastomeric polymer topcoat layer, the substrate layer having a higher density than the fleshcoat or topcoat layers and being thicker than either the fleshcoat or the topcoat layers and the combined thickness of the fleshcoat and the topcoat layers being in the range 30 to 175% of the thickness of the substrate layer, e.g., 65 to 125% especially 70 to 110% of the thickness of the substrate layer and desirably the thickness of the topcoat layer being in the range 150 to 50% of the thickness of the fleshcoat layer. The thickness of the topcoat may be in the range 10 to 95% e.g. 30 to 80% of the thickness of the substrate. The fleshcoat may be in the range 10 or 20 to 95% of the thickness of the substrate.

The ratio of the thickness of the topcoat to the thickness of the substrate desirably lies within the range 1.5:1 to 0.5:1 more particularly 1.2:1 to 0.8:1 and is preferably about 1:1, thus the material is substantially symmetrical about the plane through the centre of the inner (substrate) layer.

In a preferred form of the invention the strength imparting porous elastomeric polymer substrate layer has compact voids radomly distributed through the layer intercommunicating via pores penetrating the walls between the voids, and the fleshcoat layer is microporous having compact voids randomly distributed through the layer intercommunicating via pores penetrating the walls between the voids, and the topcoat layer is microporous having compact voids randomly distributed through the layer intercommunicating via pores penetrating the walls between the voids, and the substrate is characterised by having wall thicknesses between the voids generally greater than those in the fleshcoat or the topcoat.

The invention enables preferred materials to be made which are further characterised by having a cut tear strength (as defined herein) of at least 1.5, e.g., at least 2.3 kg. and a ratio of cut tear strength to stiffness (as defined herein) of at least 4.2, e.g., in the range 5.0 to 10.5 or preferably 6 to 10 and a stiffness (as herein defined) of not more than 0.65 and preferably in the range 0.25 to 0.60, e.g., 0.30 to 0.50.

According to a preferred form of the present invention the substrate layer consists of a porous matrix of elastomeric polymer affording a plurality of compact voids intercommunicating by pores, the said substrate layer being from 0.5 to 1.2., or 1.5 e.g., 0.6 to 1.0 mm preferably 0.7 to 0.9 mm thick and having a total void volume or porosity in excess of 50% and at least 65% of the porosity being provided by pores and the voids with which the said pores interconnect, the said pores having diameters of at least 5.0 microns and preferably less then 20 microns as determined by mercury intrusion penetrometry. The mean pore diameter of the substrate layer is preferably in the range 5 to 20 microns, preferably 7 to 15 microns, e.g., 10 to 12 microns as determined by mercury intrusion penetrometry.

The fleshcoat and topcoat layers are preferably integrally adhered to the substrate layer. The fleshcoat and topcoat layers preferably have thicknesses in the range 0.20 to 0.45 mm. The topcoat layer and the fleshcoat layer desirably have densities of less than 0.40 grams per cc., e.g., in the range 0.2 to 0.4, e.g., 0.25 to 0.35.

The elastomeric polymer is preferably an elastomeric polyurethane but can be used in admixture with other thermoplastic polymers such as polyvinyl chloride and its co-polymers and acrylonitrile polymers and co-polymers.

The preferred polyurethane polymers are essentially linear polyurethanes produced from a diisocyanate, a monomeric diol and a polyester or a polyether of molecular weight 1,000 to 3,000, the polyurethane having an intrinsic viscosity in dimethyl formamide of at least 0.8 dl/g.

However, the preferred polymer is a polyester based polyurethane material having a Shore hardness of 75A or 90A to 60D preferably at least 98A as a solid continuous sheet at 25°C. This material may be used for all three layers. However, in a preferred product it is used only for the strength imparting substrate layer and a polyurethane having a lower Shore hardness than the substrate polyurethane and thus a softer feel is used for the topcoat layer and the flesh layer. This softer material may have a nitrogen content of about 2.5% or 2.8 to 3.0 or 3.5 to 4.0%. This soft material can be made by increasing the ratio of polyester to glycol resulting in a lower requirement of diisocyanate. The polyurethane for the substrate preferably has a higher nitrogen content, e.g., at least 4.0 or 4.5% or more. The soft polyurethane for the topcoat layer and the flesh layer may be based on a polyether polyurethane instead of a polyester polyurethane.

In one form of the invention, the polyurethanes used for the topcoat, fleshcoat and substrate are made from the same polyester, diol and diisocyanate and the polyurethane used for the substrate has a nitrogen content of at least 4% whilst the polyurethanes used for the topcoat and fleshcoat have lower nitrogen contents than the substrate polyurethane.

The substrate layer preferably has a porosity in the range 50 to 65% and less than 7% of the total porosity is provided by pores and the voids with which they interconnect the said pores having diameters in excess of 100 microns and at least 50% of the total porosity is provided by pores and the voids with which they interconnect the said pores having diameters in the range 6.4 to 17.5 microns.

The substrate layer when a cut cross-section is viewed is preferably further characterised by compact voids the majority of which have maximum dimensions in the plane of the cross-section of 30 to 100 microns, the majority of these voids having shortest transverse dimensions in the plane of the cut surface of ¼ their maximum dimension and above, the shapes of the voids being nonspherical and though irregular in outline compact in shape, the voids being separated by more dense regions (which can be considered as thicker walls) which contain smaller pores visible at 150-fold magnification the majority of which are 1 to 30 microns across and spaced apart by 1 to 10 microns the majority of these denser regions being of 30 to 100 microns across between adjacent larger voids.

The microporous fleshcoat and topcoat layers when a cut cross-section is viewed are preferably characterised by irregular shaped through compact voids from 5 to 75 microns across the majority being 20 to 50 microns across the said voids being defined or surrounded by thin walls 1 to 5 microns thick the voids intercommunicating by pores passing through these thin walls.

The novel product may be made by a process comprising depositing a layer of coagulable elastomeric polymer fleshcoat composition on a porous support to form the fleshcoat layer, then prior to coagulation depositing a layer of coagulable elastomeric polymer substrate composition on top of the layer of fleshcoat composition and then prior to coagulation depositing a layer of coagulable elastomeric topcoat composition on top of the layer of substrate composition, and then coagulating the composite material to an integrally adhered microporous three-layer structure free from fibrous reinforcement at least the substrate composition and at least one of the fleshcoat or topcoat compositions containing a removable particulate filler, the filler in the said fleshcoat or topcoat compositions having an average particle size smaller than that used in the substrate composition.

The elastomeric polymers are preferably elastomeric polyurethanes of intrinsic viscosity of at least 0.8 e.g., 1.0 to 2.0 or 1.0 to 1.4 deciliters/g. (measured in dilute solution in dimethylformamide). The polyurethanes of the fleshcoat and topcoat layers are desirably softer than that of the substrate layer, e.g., the substrate polymer as a thin void free film 0.2 to 0.4 mm. thick may have a modulus at 25% extension of at least 55 kg/cm$^2$, e.g., 60 to 100 or 70 to 80 and the fleshcoat and topcoat polymers as a thin void free film 0.2 to 0.4 mm. thick may have a modulus at 25% extension of less than 55 kg./cm$^2$, e.g., 30 to 45 or 50 kg/cm$^2$.

The substrate composition preferably comprises the substrate polyurethane dissolved in a polar organic solvent, e.g., dimethylformamide, at least 20% by weight concentration, e.g., 25 to 40%, e.g., 30 to 35% with a particulate dissolvable filler, e.g., a water soluble inorganic salt dispersed therethrough, which is substantially insoluble in the organic solvent, and the filler has an average particle size as determined by Coulter counter measurements in the range 20 to 200 microns, e.g., 25 to 75 or 50 microns and the ratio of filler to polymer is in the range 1.8 : 1 to 2.7 : 1, e.g., 1.9 : 1 to 2.2 : 1 parts by weight. More particularly it is preferred to use a particle size of 30 to 95 microns with a filler to polymer ratio in the range 1.8 : 1 to 2.8 : 1 at the 30 micron salt particle size and in the range 1.8 : 1 to 4.0 : 1 at about the 95 micron particle size.

As taught in the specification of U.S. Pat. application Ser. No. 453,123 working in this range produces a material of improved strength. The disclosure of U.S. application Ser. No. 453,123 is incorporated herein by reference. Attention is particularly directed to its teaching as to the preferred formulations for a substrate for an artificial leather and the disclosure concerning preferred filler particle sizes. It is preferred to make use of this teaching in connection with the substrate for the present invention.

The flesh and topcoat compositions similarly contain dispersed filler but it is preferred that the filler should have an average particle size below 20 microns, e.g., in the range 1 to 15 or 5 to 10 microns. The ratio of filler to polymer is preferably at least 2.5 : 1, e.g., in the range 3 : 1 to 6 : 1 parts by weight.

The polymer composition is preferably produced by forming the polymer in solution from low molecular weight reactants in solution to produce a polymer solution of the desired concentration and then mixing the particulate filler (which is preferably water soluble) into the polymer solution, e.g., with a high energy mixer. The blend is then coagulated to self-supporting form by means of a non-solvent liquid, e.g., it is preferably extruded onto a porous belt and contacted with non-solvent, e.g., water (e.g., at 20° – 60°C.) or water solvent blends, e.g., of 5 to 30% solvent content, having a non-solvent action, e.g., by immersion in the liquid non-solvent. The non-solvents used can contain proportions of dissolved filler, e.g., in continuous operation contents of as high as 15% or so of filler can be tolerated. Pure non-solvents are equally effective.

The coagulated self-supporting layer is then preferably stripped from the belt whilst wet and immersed in non-solvent, e.g., heated to, say, 60°C., and the dissolvable filler leached out to a satisfactory level, e.g., not more than 1,000 mg. of filler per square meter of sheet should remain.

The leached layer is then dried and can be given any appropriate finishing operation.

The preferred density of the substrate layer of the product is between 0.4 and 0.7 gr. per cc. though it may be up to 0.8 for certain uses.

It is preferred to use filler particle sizes and filler to polymer ratios such that the density of the substrate layer remains within the range 0.4 to 0.5 or 0.55. Thus with the lower end of the range of permitted particle sizes the lower end of the permitted range of ratios of filler to polymer is preferably used and at the higher end of the range of particle sizes the higher end of the range of ratios of filler to polymer is preferably used, e.g., with average particle sizes of 20 to 30 microns the filler ratio is preferably 1.9:1 to 2.1:1 with 30 to 60 micron filler from 2.1:1 to 2.2:1, 2.3:1 or 2.4:1 and with filler particle sizes above 60 microns salt ratios of above 2.2:1 or 2.4:1.

Figure 9:
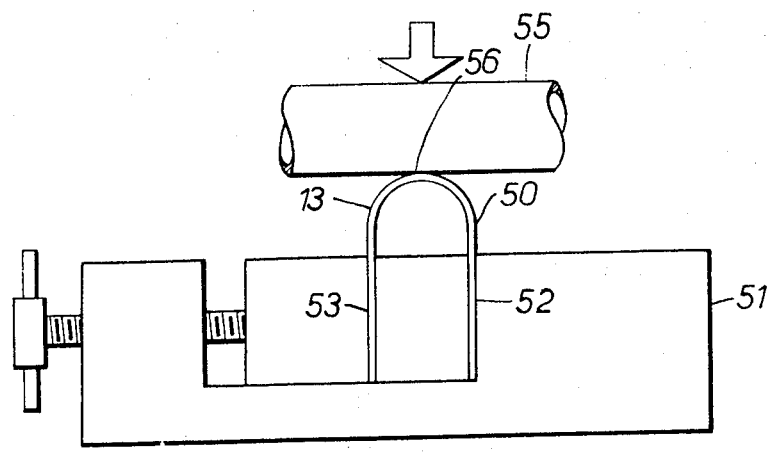

The invention may be put into practice in various ways and certain specific embodiments will be described by way of example with reference to the accompanying photomicrographs which are all vertical cross-sections through microporous sheet materials at 55-fold magnification and in which:

FIGS. 1 to 8 are of three-layer materials in accordance with the invention described in Examples 1 to 8 respective, and FIG. 9 is a diagrammatic side elevation of a test rig used for determining the stiffness of materials described herein.

The photomicrographs of FIGS. 1 to 8 were taken on a Cambridge Instruments Limited Stereoscan Mark 2 electron microscope. The photomicrographs were prepared by cutting a smooth clean cross-section through the sheet samples. The cut surface was then coated with a thin metallic, e.g., gold or palladium reflecting layer as is conventional in preparing samples for electron photomicrography. A stream of electrons was then directed onto the cut surface at 45°C. and the electrons reflected from the surface also at 45°C. were collected and used to produce an optical image which was photographed. It will be appreciated that the depth of focus of such photographs is very much greater than in optical photography and thus that in effect one is able to see into the voids and cavities.

In the examples a variety of polyurethane polymers are used. They were made in solution in dimethylformamide from a polyester or polyether by reaction with a diol and a diisocyanate under an inert atmosphere.

Polyurethane 1

880 parts (I) of pure N,N-dimethylformamide were placed in a 1,500 parts (II) reactor flushed with dry nitrogen. 0.027 parts (IX) of paratoluene sulphonic acid and 0.020 parts (X) of dibutyltin dilaurate were dissolved in the dimethylformamide. 205.0 parts (III) of Desmophen 2001 polyester (a hydroxyl-terminated polyester of 2,000 molecular weight, having an acid number of less than 2 and a hydroxyl number of about 55 mg. KOH per g. made from about 1 mol butane diol. -1,4, 1.12 mol ethylene glycol and 2 mols adipic acid) and 48 parts (IV) of butane diol -1,4 were then added and dissolved in the mixture and the temperature of the mixture adjusted to 25°C.

171.6 parts (V) of 4,4-diphenylmethanediisocyanate were then added bit by bit care being taken to keep the temperature from rising above 50°C. Once the addition was complete the mixture was heated to 60°C. and maintained at that temperature for 1½ hours with stirring. The excess unreacted isocyanate content was then determined by titration of an aliquot. Sufficient butane diol (3.0 parts (VI)) was then added to react essentially stoichiometrically with the unreacted isocyanate. The mixture was then maintained at 60°C. with stirring and the viscosity measured periodically until it had risen to a value of about 3,500 poise (Brookfield 5 or 6 spindle) as corrected to 24°C. 4.10 parts (VII) of butane diol 1,4 were then added as capping agent to terminate the reaction dissolved in 3.5 parts (VIII) of N,N-dimethylformamide.

The nitrogen content was about 4.5% and the polyester content about 50%. The polyurethane had a Shore hardness of 55D as a solid continuous sheet at 25°C.

The polyurethane has the following physical properties:

The solution has a viscosity of 4,100 poise at 33.2% solids at 24°C. (Brookfield RVT No. 7 spindle 2.5 rpm); an intrinsic viscosity of 1.08 deciliter/gram; and a $k'$ of 0.60. A void free film cast from the solution by slow evaporation of the solvent has a tensile modulus (kg/cm$^2$) at 5, 25, 50 and 100% elongation of 27.3, 74.5, 95.8 and 120 respectively; a tensile strength (kg/cm$^2$) of 589; an elongation at the crystalline point of 480% and at break of 615%; a cut tear strength of 180 kg/cm and a tear strength to 25% modulus ratio of 2.4.

Polyurethane 2

This is made in the same way as Polyurethane 1 but the amounts of the reactants are varied.

DFM (I) is 900 parts,
paratoluene sulphonic acid (IX) is 0.06 parts,
dibutyltin dilaurate (X) is 0.027 parts,
Desmophen 2001
polyester (III) is 282.4 parts,
butane diol (IV) is 30.0 parts,
4,4'-diphenylmethanediisocyanate (V) is 132.6 parts,
butane diol (VI) is 5 parts,
butane diol (VII) is 5 parts, and
DMF (VIII) is 100 parts.

This gives a polymer with 3.3% nitrogen content.

The solution has a viscosity at 33.2% solids at 24°C. of 4,100 poise; an intrinsic viscosity of 1.145; a $k'$ of 0.48. A film cast from the solution as for polyurethane 1 has a tensile modulus (kg/cm$^2$) at 10, 25 and 50% of 23.5, 37.9 and 49.6 respectively; a tensile strength (kg/cm$^2$) of 465; an elongation at the crystalline point of 620 at break of 710%; a cut tear strength of 113 kg/cm and a tear strength to 25% modulus ratio of 2.98.

Polyurethane 3

This is made in the same way as polyurethane 1 but the amounts of the reactants are varied and Bayer polyester Desmophen trial product PU 1816 is used instead of Desmophen 2001. PU 1816 is a hydroxyl terminated polyester of 2,250 molecular weight, having an acid number of less than 2 and a hydroxyl number of 50 ±2 mg. KOH per gram and is similar to Desmophen 2001 apart from its diol component.

DMF (I) is 900 parts, paratoluene sulphonic acid (IX) is 0.06 parts,
dibutyltin dilaurate (X) is 0.027 parts,
polyester PU 1816 (III) is 271.3 parts,
butane diol (IV) is 33.0 parts,
4,4'-diphenylmethanediisocyanate (V) is 140.6 parts,
butane diol (VI) is 5.1 parts,
butane diol (VII) is 5.0 parts, and
DMF (VIII) is 100 parts.

This gives a polymer with a 3.5% nitrogen content.

The solution has a viscosity at 33.2% solids at 24°C. of 3,400 poise; an intrinsic viscosity of 1.11; and a $k'$ of 0.49. A film cast from the solution as for polyurethane 1 has a tensile modulus (kg/cm$^2$) at 10, 25 and 50% of 19.0, 36.0 and 48.2 respectively; a tensile strength (kg/cm$^2$) of 519; an elongation at the crystalline point of 560% and at break of 640%; a cut tear strength of 143 kg/cm and a tear strength to 25% modulus ratio of 3.98.

Polyurethane 4

This is made in the same way as polyurethane 1 except that the dibutyltindilaurate catalyst, component (X), is omitted. The reactants are as follows:

| | |
|---|---|
| DMF (I) | 900.00 parts |
| Paratoluene sulphonic acid (IX) | 0.06 parts |
| Polymeg 1930 polyether (III) | 254.20 parts |
| Butane diol (IV) | 38.30 parts |
| 4,4'-diphenylmethanediisocyanate(V) | 152.70 parts |
| Butane diol (VI) | 3.00 parts |
| Butane diol (VII) | 5.00 parts |
| DMF (VIII) | 20.00 parts |

This gives a polymer with a 3.8% nitrogen content. Polymeg 1930 is a hydroxyl terminated poly-tetramethylene glycol having a molecular weight of 1930, a hydroxyl number of 53 to 59 and a very low acid number not in excess of 0.05 mg. KOH per gram. It has a melting point of 38°C. and a specific gravity of 0.985 grams per cc at 25°C.

The polymer solution has a viscosity at 33.2% solids at 24°C. of 4,400 poise; an intrinsic viscosity of 0.88 dl/g; and a $k'$ of 0.65. A film cast from the solution as for polyurethane 1 had a tensile modulus (kg/cm$^2$) at 5, 25, 50 and 100% extension of 9.6, 37.4, 50.8 and 66.9 respectively; a tensile strength (kg/cm$^2$) of 447; an elongation at the crystalline point of 680% and at break of 715%, a cut tear strength of 95.8 kg/cm and a tear strength to 25% modulus ratio of 2.55.

The Removable Filler

Sodium chloride (or indeed other equivalent preferably water soluble removable filler) was ground in a pin and disc mill with air classification to separate out fines and return oversize particles for regrinding. The sodium chloride powder before dispersing in the polymer solution had its particle size determined by the Coulter counter technique.

Coulter counter measurement of particle size is a well-known technique and is widely used and described in the literature, for example, in the book 'The Coulter Principle of Particle Size Measurement' by T. Allen and K. Marshall, available in the National Library of Science and Intention (Patent Office Branch) in London.

However, a brief description of the technique will now be given. The sodium chloride whose particle size is to be measured is suspended as a very dilute suspension in a saturated 4% solution of ammonium thiocyante in isopropanol which is previously saturated with sodium chloride.

The mixture is subjected to ultrasonic vibration to ensure that none of the particles have agglomerated.

The suspension is then placed in the measuring chamber of the apparatus which is described in U.S. Pat. No. 2,656,508. An electrode is placed in the chamber. A tube containing another electrode and having a very small orifice appropriate to the particle size is immersed in the suspension which is then drawn through the tube. For salt of 9 to 126 microns average particle size a tube having an orifice of 280 microns is used. Each time a particle passes through the orifice a voltage pulse proportional to particle volume is produced, the larger the pulse the larger is the particle.

The electronic circuit of the instrument can be arranged so as to count only pulses having a volume within a certain range and the number of pulses within a given time within each range is counted for a series of ranges. The results are then adjusted to give a distribution of particle sizes by weight.

The concentration of the particles in the sample is arranged to be below the so-called 'coincidence level', namely, the concentration at which the probability of more than one particle passing through the orifice at the same time and being counted as a single particle becomes significant. Thus for salt of particle size about 10 microns a 0.05 to 0.1% by weight suspension is used, for about 50 microns 0.1 to 0.3% by weight is used and for about 90 microns, about 0.3 to 0.5% by weight is used.

All the values of average particle size given in the specification refer to measurement with a Coulter counter industrial model ZB with a volume converter model M2 using a tube with an orifice of 280 microns except in connection with Table 3.

For any given average particle size the negative deviation value is the particle size below which only 16% by weight of the total mass is located and the positive deviation value is the particle size above which only 16% by weight of the total mass is located. The positive and negative deviations from the average do not have to be equal. The average particle size is the size at which 50% by weight falls on either side of the value given.

Thus at least 84% by weight of the filler desirably has a particle size of at least 10, 15 or 30 microns and at least 68% by weight has a particle size in the range 15 to 100 or 25 to 75 microns and especially 30 to 70 microns.

Desirably also the positive and negative deviations are less than 50%, e.g., in the range up to 45%, e.g., 30 to 45%.

EXAMPLE 1

This is an example of a three-layer product in accordance with the invention.

The substrate 15 has a coarser pore structure than the topcoat 16 and fleshcoat 17 which are made from a softer polymer (polyurethane 2 described above) than the substrate.

The method used to form the composite adhered layers is as follows:

A fleshcoat paste is doctor knife spread first onto a porous polyethylene sheet, a substrate paste is then spread over the layer of fleshcoat paste and a topcoat paste is then spread over the substrate paste. The adhered superposed layers of pastes on the porous support are then immersed in pure stationary water (water solvent salt blends are equally effective) at 30°C. for 1 hour with the coated face downwards to coagulate the polymer in the paste to self-supporting form. The composite three-layer material is then stripped from the support without rupturing and immersed in stationary water at 60°C. for 5 hours to substantially completely remove the DMF and reduce the sodium chloride content to a very low level, i.e., well below 1000 mg/sq. meter, so as to give accurate density measurements.

The material is then dried at about 70°C. in an air oven for about 2 hours. Its properties are given in Table 1 below.

The substrate paste 1 is made by mixing and milling the polyurethane solution described above as polyurethane 1 (diluted to 32% resin concentration) with 1.90 parts per part of polyurethane of sodium chloride particles having an average particle size of 27 microns (negative deviation 12 microns; positive deviation 21 microns) followed by de-airing under vacuum.

The topcoat and fleshcoat paste 1 is made with the polyurethane solution described above as polyurethane 2 (diluted to 25% resin concentration) mixed and milled with 3 parts per part of polyurethane of sodium chloride particles having an average particle size of 9 microns (negative deviation −3 microns; positive deviation +4 microns) followed by de-airing under vacuum.

The properties of the material are given in Table 1.

EXAMPLE 1A

A single layer material made from the same paste as substrate paste 1 and in the same manner but at a considerably increased thickness (1.4 mm.) has its properties listed in Table 3 and the results of mercury intrusion penetrometry listed in Table 4.

EXAMPLE 2

This is an example of a three-layer product similar to Example 1 but having a thicker substrate 18 of less coarse structure.

The material is made in the same way as Example 1, the only differences being the use of sodium chloride having an average particle size of 14 microns (negative deviation 6 microns; positive deviation 15 microns) in the substrate paste.

The properties of the material are given in Table 1.

A single layer material made from substrate paste at the same thickness had a density of 0.56.

EXAMPLE 3

This is an example of a three-layer product similar to Example 1 but having a different polymer in the topcoat and fleshcoat layers.

The method and formulations are the same as for Example 1, the only difference being that the polyurethane solution described above as polyurethane 3 is used in the fleshcoat and topcoat layers and the layers are of different thicknesses.

The properties of the material are given in Table 1.

EXAMPLE 4

This is an example of a three-layer material similar to Example 1 but having a different polymer, namely, polyurethane 3, described above, in the topcoat and fleshcoat pastes. Also the substrate paste is made with coarser sodium chloride of average particle size 31 microns (negative deviation 12.5 microns; positive deviation 18 microns) and with 2.0 parts of salt per part of polymer. Apart from this the method and formulations are as in Example 1.

The properties of the material are given in Table 1.

EXAMPLE 6

This is an example of a three-layer material similar to Example 1 but having a different polymer, namely, polyurethane 3 described above, in the topcoat and fleshcoat pastes. Also the substrate paste is made with coarser sodium chloride of average particle size 49 microns (negative deviation 18.5 microns; positive deviation 31 microns) and with 2.2 parts of salt per part of polymer. Apart from this the method and formulations are as in Example 1.

The properties of the material are given in Table 1.

EXAMPLE 6A.

A single layer material made from a substrate paste closely similar to the substrate paste of Example 6 (differing only slightly in salt particle size) using the same method but at considerably increased thickness has its properties listed in Table 3 and the result of mercury intrusion penetrometry listed in Table 4.

EXAMPLE 7

This is an example of a three-layer material similar to Example 1 but having a different polymer, namely, polyurethane 1 described above, in the topcoat and fleshcoat pastes.

The method and formulations are the same as Example 1 except that in the substrate paste 1.90 parts of sodium chloride are used per part of polyurethane.

The properties of the material are given in Table 1.

EXAMPLE 8

This is an example of a three-layer material similar to Example 1 but using smaller particle size salt in the substrate and a harder polymer in the fleshcoat and topcoat layers, namely, the same polyurethane 1 as used for the substrate.

The fleshcoat, substrate and topcoat were laid down, coagulated, leached and dried in a similar manner to that described in Example 1.

The substrate formulation differs from Example 1 in using sodium chloride of 17 microns average particle size and 2.05 parts of sodium chloride per part of polyurethane. The fleshcoat and topcoat formulations are the same as those used in Example 1 apart from the different polyurethane.

The properties of the product are given in Table 1.

All these examples have elongations at break in the range 375 to 500%.

EXAMPLES 10 to 24

Further examples illustrating the effect of varying substrate thickness (Examples 10 to 13 and 14 to 17) and salt ratio (Examples 18 and 19, 20 and 21 and 22 to 24) are given below in Table 1.

All these examples have elongations at break in the range 375 to 500%.

EXAMPLES 25 to 31

These are further examples illustrating (in Example 25) the use of a polyether polyurethane (polyurethane 4 above) in the outer layers and in the other examples the effect of changing the layer thickness and density relationships.

The details of salt ratio, polymer layer thickness, salt particle size and physical properties are given in Tables 2A and 2B below.

Comparison of Examples 26 and 27 demonstrate that only a very slight improvement in cut tear/stiffness is obtained by disposing the standard topcoat as two thinner layers on either face of the substrate. Comparison of Examples 28 and 27 indicates that the use of coarser salt in the substrate very markedly improves the cut tear/stiffness ratio and comparison of Example 28 with Example 29 demonstrates the further improvement obtained on reducing the thickness of the substrate.

Comparison of the pairs of Examples 27 and 30 and 29 and 31 respectively indicates the drastically lower cut tear/stiffness ratio which results when the substrate layer is not thicker and more dense than the fleshcoat and topcoat layers.

Examples 5 and 6 and 25 were compared for their resistance to hydrolysis. 2 inch by 2 inch samples were separately stored in the vapour contained in a closed chamber held at 90°C., the liquid phases in the two chambers being distilled water and 0.085 g/l aqueous ammonia. The samples were examined daily for the first appearance of surface cracks on hand flexing, the first value quoted, and for crumbling of the material on hand flexing, the second value quoted. The material of Examples 5, 6 and 25 showed surface cracking after 17, 17 and 21 days in the ammonia vapour and 33, 33 and 46 days in the water vapour and crumbled (total failure) after 18, 18 and 29 days in the ammonia vapour and 36, 38 and 50 days in the water vapour.

This demonstrates the improved hydrolysis resistance of a material having polyether polyurethane in the outer layers.

TABLE I

| Ex. | Substrate Polymer | Substrate Resin Conc. | Salt Particle Size | Salt Ratio | Top Coat and flesh Coat Polymer | Salt Ratio | Resin Conc. | Total Thickness | Top coat thickness mm | Substrate thickness mm |
|---|---|---|---|---|---|---|---|---|---|---|
| 1 | 1 | 32% | 27 | 1.9:1 | 2 | 3:1 | 25% | 1.67 | 0.40 | 1.00 |
| 2 | 1 | 32% | 14 | 1.9:1 | 2 | 3:1 | 25% | 1.65 | 0.38 | 0.99 |
| 3 | 1 | 32% | 27 | 1.9:1 | 3 | 3:1 | 25% | 1.66 | 0.45 | 0.86 |
| 4 | 1 | 32% | 31 | 2.0:1 | 3 | 3:1 | 25% | 1.53 | 0.33 | 0.80 |
| 5 | 1 | 32% | 36 | 2.1:1 | 3 | 3:1 | 25% | 1.53 | 0.28 | 0.82 |
| 6 | 1 | 32% | 49 | 2.2:1 | 3 | 3:1 | 25% | 1.39 | 0.29 | 0.80 |
| 7 | 1 | 32% | 27 | 1.9:1 | 1 | 3:1 | 25% | 1.67 | 0.3 | 0.85 |
| 8 | 1 | 32% | 17 | 2.05:1 | 1 | 3:1 | 25% | 1.63 | 0.21 | 1.2 |
| 9 | 1 | 32% | 17 | 2.05:1 | 1 | 3:1 | 25% | 1.62 | 0.36 | 0.95 |
| 10 | 1 | 32% | 31 | 1.9:1 | 3 | 3:1 | 25% | 1.49 | 0.38 | 0.72 |
| 11 | 1 | 32% | 31 | 1.9:1 | 3 | 3:1 | 25% | 1.50 | 0.34 | 0.77 |
| 12 | 1 | 32% | 31 | 1.9:1 | 3 | 3.1 | 25% | 1.64 | 0.50 | 0.85 |
| 13 | 1 | 32% | 31 | 1.9:1 | 3 | 3:1 | 25% | 1.66 | 0.38 | 1.00 |
| 14 | 1 | 32% | 49 | 1.9:1 | 3 | 3:1 | 25% | 1.69 | 0.48 | 0.62 |
| 15 | 1 | 32% | 49 | 1.9:1 | 3 | 3:1 | 25% | 1.59 | 0.48 | 0.72 |
| 16 | 1 | 32% | 49 | 1.9:1 | 3 | 3:1 | 25% | 1.61 | 0.37 | 0.87 |
| 17 | 1 | 32% | 49 | 1.9:1 | 3 | 3:1 | 25% | 1.60 | 0.28 | 0.97 |
| 18 | 1 | 32% | 31 | 1.9:1 | 3 | 3:1 | 25% | 1.50 | 0.34 | 0.77 |
| 19 | 1 | 32% | 31 | 2.0:1 | 3 | 3:1 | 25% | 1.53 | 0.33 | 0.80 |
| 20 | 1 | 32% | 36 | 1.9:1 | 3 | 3:1 | 25% | 1.57 | 0.43 | 0.72 |
| 21 | 1 | 32% | 36 | 2.0:1 | 3 | 3:1 | 25% | 1.53 | 0.28 | 0.82 |
| 22 | 1 | 32% | 49 | 2.1:1 | 3 | 3:1 | 25% | 1.35 | 0.26 | 0.85 |
| 23 | 1 | 32% | 49 | 2.2:1 | 3 | 3:1 | 25% | 1.42 | 0.29 | 0.93 |
| 24 | 1 | 32% | 49 | 2.3:1 | 3 | 3:1 | 25% | 1.41 | 0.29 | 0.83 |

| Ex. | Flesh coat thickness mms | Weight grams/meter² | Cut Tear Kg | Stiffness Kg | 25% IM Kg/cm | Cut Tear/ Stiffness | WVP A | WVP B |
|---|---|---|---|---|---|---|---|---|
| 1 | 0.27 | 911 | 3.7 | 0.60 | 3.0 | 6.2 | 105 | 90 |
| 2 | 0.28 | 842 | 2.4 | 0.51 | 2.8 | 4.7 | 135 | 105 |
| 3 | 0.35 | 825 | 2.7 | 0.42 | 2.6 | 6.4 | 105 | 90 |
| 4 | 0.40 | 707 | 2.3 | 0.36 | 2.3 | 6.4 | 115 | 70 |
| 5 | 0.43 | 713 | 2.4 | 0.33 | 2.3 | 7.3 | 112 | 68 |
| 6 | 0.30 | 654 | 2.80 | 0.29 | 2.1 | 9.7 | 108 | 65 |
| 7 | 0.52 | 836 | 2.85 | 0.65 | 3.3 | 4.4 | 80 | 60 |
| 8 | 0.22 | 853 | 2.9 | 0.86 | 3.50 | 3.4 | 120 | 67 |
| 9 | 0.31 | 788 | 2.5 | 0.63 | 3.1 | 4.0 | 130 | — |
| 10 | 0.39 | 678 | 2.3 | 0.30 | 2.1 | 7.7 | 87 | 57 |
| 11 | 0.39 | 703 | 2.4 | 0.34 | 2.4 | 7.1 | 87 | 55 |
| 12 | 0.39 | 760 | 2.7 | 0.41 | 2.5 | 6.6 | 82 | 52 |
| 13 | 0.28 | 809 | 3.2 | 0.59 | 3.0 | 5.4 | 80 | 50 |
| 14 | 0.59 | 803 | 2.9 | 0.28 | 2.2 | 10.4 | 85 | 75 |
| 15 | 0.39 | 820 | 3.5 | 0.38 | 2.5 | 9.2 | 75 | 70 |
| 16 | 0.37 | 860 | 3.7 | 0.45 | 2.9 | 8.2 | 55 | 55 |
| 17 | 0.35 | 900 | 4.7 | 0.63 | 3.4 | 7.5 | 45 | — |
| 18 | 0.39 | 703 | 2.4 | 0.34 | 2.4 | 7.1 | 87 | 55 |
| 19 | 0.40 | 707 | 2.3 | 0.36 | 2.3 | 6.4 | 115 | 70 |
| 20 | 0.42 | 727 | 2.7 | 0.35 | 2.3 | 7.7 | 87 | 56 |
| 21 | 0.43 | 713 | 2.4 | 0.33 | 2.3 | 7.3 | 112 | 68 |
| 22 | 0.24 | 662 | 2.9 | 0.34 | 2.4 | 8.5 | 95 | 62 |
| 23 | 0.20 | 688 | 3.0 | 0.35 | 2.3 | 8.5 | 95 | 58 |
| 24 | 0.29 | 677 | 2.8 | 0.35 | 2.4 | 8.0 | 98 | 70 |

TABLE 2A

| | Substrate | | | | | | Top coat and Flesh Coat | | | | | | | | |
|---|---|---|---|---|---|---|---|---|---|---|---|---|---|---|---|
| Ex. | Substrate polymer | Substrate resin Conc. | Salt Particle Size | Salt ratio | Polymer | Salt ratio | Resin Conc. | Salt Particle Size | Total thickness | Top coat thickness mm. | Top coat density (1) | Substrate thickness | Substrate density (1) | Flesh coat thickness | Flesh coat density (1) | Total weight-grams/meter² |
| 25 | 1 | 32% | 50 | 2.3:1 | 4 | 3:1 | 25% | 9 | 1.57 | 0.34 | — | 0.85 | — | 0.34 | — | 680 |
| 26 | 1 | 30% | 17 | 2.2:1 | 1 | 3:1 | 25% | 9 | 1.61 | 0.30 | 0.31 | 1.27 | 0.43 | — | — | 660 |
| 27 | 1 | 30% | 17 | 2.2:1 | 1 | 3:1 | 25% | 9 | 1.55 | 0.14 | 0.29 | 1.25 | 0.44 | 0.14 | 0.33 | 650 |
| 28 | 1 | 30% | 40 | 2.2:1 | 1 | 3:1 | 25% | 9 | 1.67 | 0.23 | 0.33 | 1.21 | 0.46 | 0.17 | 0.31 | 720 |
| 29 | 1 | 30% | 40 | 2.2:1 | 1 | 3:1 | 25% | 9 | 1.58 | 0.32 | 0.30 | 0.91 | 0.46 | 0.31 | 0.29 | 635 |
| 30 | 1 | 30% | 9 | 2.2:1 | 1 | 3:1 | 25% | 17 | 1.65 | 0.64 | 0.42 | 0.36 | 0.37 | 0.62 | 0.37 | 645 |
| 31 | 1 | 30% | 9 | 2.2:1 | 1 | 3:1 | 25% | 40 | 1.58 | 0.61 | 0.45 | 0.35 | 0.39 | 0.59 | 0.40 | 664 |

TABLE 2B

| Example | Cut Tear Kg | Stiffness Kg | 25% IM Kg/cm | Cut Tear/ Stiffness | WVP A | WVP B | Tensile Strength Kg/cm | Elongation at break % |
|---|---|---|---|---|---|---|---|---|
| 25 | 2.33 | 0.35 | 2.1 | 6.7 | 110 | 73 | — | — |
| 26 | 1.61 | 0.47 | 1.8 | 3.4 | 140 | — | 10.3 | 440 |
| 27 | 1.59 | 0.43 | 1.8 | 3.7 | 140 | — | 10.4 | 440 |
| 28 | 2.08 | 0.38 | 1.7 | 5.5 | 100 | — | 9.4 | 420 |
| 29 | 1.59 | 0.25 | 1.5 | 6.4 | 120 | — | 8.0 | 400 |
| 30 | 1.41 | 0.46 | 1.8 | 3.1 | 150 | — | 8.8 | 390 |
| 31 | 1.84 | 0.51 | 2.1 | 3.6 | 115 | — | 9.3 | 390 |

Notes on Tables 1, 2A and 2B

Cut tear or tear propagation strength is measured as described below under (H) in connection with Table 3.

Stiffness is measured by the following method.

The method seeks to represent the forces required by the tendons of the foot to deform a fold in a shoe vamp. Referring to FIG. 9, a sample of material 50 which is 7 cm. long by 4.5 cm. wide is clamped in a jig 51 with its outer or topcoat surface, e.g., 13 bowed outwardly and a length 52, 53 of 20 cm. from each end enclosed within the clamp, the ends within the clamp being 20 cm. apart so as to form an inverted U-shaped trough.

The jig is located in an Instron tensile testing machine and 15 cm. diameter metal rod 55 fixed into the cross head and lowered at a rate of 2.5 cm/minute onto the top 56 of the inverted U-shaped sample, the rod being parallel to the plane bottom ends of the sample and perpendicular to the longitudinal axis of the inverted U-shaped trough (See FIG. 9). The stiffness is defined as the load required to make an indentation 2.5 mm. deep in the bottom of the inverted U-shaped sample. 25% initial modulus and water vapour permeability are measured as described below for Table 3.

WVP A is the value for the material before surface finishing.

WVP B is the value for the material after surface finishing. The same surface finishing treatment is given to each sample. It imparts improved resistance to penetration by liquid water and to soiling and converts the surface from a dull matt finish to a lustrous deeper coloured finish, and imparts a grain appearance to the treated surface, and confers upon the product a leatherlike break.

The spraying is carried out as follows:

12.9 parts of a 31% solution of polyester polyurethane made as above (polyurethane 1) is thoroughly mixed with 7.1 parts of DMF and 0.4 parts of Superba black. 7.52 parts of the resulting blend is mixed with 43.24 parts of additional DMF, 34.53 parts of cyclohexanone and 14.71 parts of acetone. This mixture is sprayed onto the sheet material while hot air is supplied from a fishtail, being directed against the surface of the sprayed sheet. The temperature of the air measured two inches inside the fishtail is about 110°C. but after it leaves the fishtail it mixes with the cooler ambient air so that the temperature of the hot air blast just above (e.g., 1 inch above) the surface of the sheet is probably about 80°C.

In the spraying operation the solution is atomised with air under pressure (80 psig) in a standard spray gun situated 12 inches above the microporous sheet.

Just as it is leaving the spray zone the sprayed sheet encounters a blast of hot air directed at its upper surface at a small angle (e.g., an angle of some 15° so that the blast is almost parallel to the upper surface of the sheet. The air is supplied from a flattened tube (a 'fishtail') whose outlet is about 2 inches above the sheet and about 12 inches from the centre of the spray gun, measured horizontally along the path of the moving sheet, which is moving at 5 feet per minute. The hot air blast serves to fuse the DMF-containing polyurethane at the surface of the sheet.

The sheet then passes through a hot air oven (having an air temperature, in a first zone of 93°C. and in a second zone of 121°C.) to drive off residual DMF: the residence time in the oven is three minutes. The product has a black lustrous but fine-grained appearance like that of smooth fine black calf. Its thickness is about the same as that of the original sheet. The increase in dry weight is about 1 to 2 grams/sq. meter.

All the examples have values after finishing of 50 or more and these values are all quite satisfactory for shoe upper purposes since values as low as 40 are quite sufficient to produce comfortable men's shoes.

Alternative or additional finishing processes such as coating, printing and embossing can also be employed.

Density measurements in Tables 2A and 2B were obtained by splitting the layers away from each other with a band knife splitter and measuring the thickness and weighing the sample.

EXAMPLE 32

A material was made in accordance with Example 1 using as the topcoat and fleshcoat polymer polyurethane 3 and polyurethane 1 as the substrate polymer.

The topcoat and fleshcoat formulations were as in Example 3. The substrate formulation contained 32.5% polymer by weight based on polymer and solvent, 2 : 1 parts by weight of sodium chloride based on polymer; the sodium chloride had an average particle size of 40 microns as measured by Coulter counter.

The unfinished material was split on a band knife splitting machine and the properties of the separated topcoat, substrate and fleshcoat layers measured. The topcoat and fleshcoat layers were microporous layers about 0.35 mm. thick whilst the substrate was about 0.75 mm. thick.

The tensile strength of the substrate was over three times that of the stronger of the two other layers, namely, about 6 kg./cm., and its initial modulus over 10 times that of the stronger of the two other layers, namely, about 1.5 kg./cm., but its elongation at break was of the same order as the values for the other two layers, namely, in the range 300 to 450%.

TABLE 3

| EXAMPLE | | 1A | 6A |
|---|---|---|---|
| Average salt particle size (B) | | 27.5[4] | 50 |
| Positive deviation | | +10[5] | +17 |
| Negative deviation | | −10[6] | −17 |
| Salt/resin ratio | (A) | 1.90:1 | 2.20:1 |
| Density | (C) | 0.45 | 0.45 |
| Thickness (mm) | | 1.40 | 1.43 |
| Weight (g/sq.m) | | 652.5[2] | 652.5[2] |
| Tear Propagation (Cut Tear) | (H) | 1.83[1] | 2.47[1] |
| | | 1.92[2] | 2.50[2] |
| Notch tear | (F) | 4.17[2] | 4.45[2] |
| Tear Propagation/notch tear | | 46%[2] | 56%[2] |
| Tensile strength | (D) | 11.9[2] | 11.5[2] |
| Initial modulus | (E) | 2.3[2] | 2.3[2] |
| W.V.P. A | (G) | 140 | 125 |
| Porosity | (M) | 63 | 59.5 |
| Mean pore diameter. | (N) | 7.2 | 10 |

Notes on Table 3

(1) results uncorrected
(2) results adjusted to 1.45 mm. thickness and 0.45 gr/cc density.
 (A) This is the ratio in parts by weight.
 (B) These values are measured by sedimentometry. This gives values in very close agreement to those obtained by use of a Coulter counter.
(4) This is the average particle size.
(5) This is the positive deviation.
(6) This is the negative deviation.
 (C) grams per cc. obtained by weighing a measured area of the sheet product of measured thickness.
 (D) kg. per cm.
 (E) At 25% extention in kg. per cm.
 (F) kg.
 (G) Water vapour permeability in grams per sq. meter per hour at 100% relative humidity and 37°C.
 (D), (E), (F), (G) and (H) are measured by the methods set out in Belgian Pat. No. 732482.

(H) Cut tear or tear propagation is measured in kg. and the measurement is carried out on a tensile test machine of the constant rate of traverse type, e.g., as described in Belgian Pat. No. 732482, e.g., an Instron tensile testing machine. The sample used is cut with a single stroke of a press with a knife edged rectangular punch having parallel long sides 75 mm. long and parallel short sides 45 mm. long. A cut 20 mm. long is made in the specimen with a sharp knife running from the middle of one short edge parallel to the long edges. The jaws of the tensile machine are set 20 mm. apart and one edge 22.5 mm. long is gripped in one jaw and the other edge 22.5 mm. long is gripped in the other jaw. The specimen is subjected to an increasing load by separating the jaws at 10 cm. per minute until the specimen is torn along the cut. The cut tear strength of the product is defined as the average equilibrium value of the maximum load which is recorded.

(M) Porosity - First the apparent volume of the sample is determined by geometry. The true volume of solid in the sample is determined by evacuation of the sample followed by introduction of helium to atmospheric pressure and the volume so introduced is measured. The difference between the apparent and true volume gives the total void volume or porosity (X).

(N) Mean Pore Diameter and Pore Size - The term pore size or pore diameter used herein is the value obtained by the following experimental method. Pore size in this sense is not the maximum dimension of the voids in the material but reflects the dimensions of the holes or pores in the walls surrounding or defining the voids, which holes provide intercommunication between the voids. The pressure required to force mercury through a pore is inversely proportional to the pore diameter. The volume of mercury forced through the pore into the void is equal to the volume of the pore and the void. The porosity of a sample is plotted against the pore size by observation of the volume of mercury which can be forced into the sample from all sides at set pressures. The total void volume (see (M) above) is composed of pores and larger voids entered by such pores covering the full range of pore diameters each of which requires mercury at definite pressures to fill it. By pre-setting the mercury pressures (P) the volume (V) of mercury forced in is determined and hence the ratio at that pressure of $$\frac{V_t}{X}$$

is determined. This is the porosity at that pore size. By altering the mercury pressure the pososity can be plotted as a function of pore diameter. This will level off at some value which is the total porosity of the sample, i.e., all pores and voids are filled with mercury. 0.03 microns is considered as the lowest diameter. The value so obtained is in very close agreement to other methods but has the advantage of showing the range of pore diameters. The point of inflection in the curve is taken as the mean pore diameter.

The initial pressure used was 5 psi absolute.

Water vapour permeability is measured as follows:

A 33 mm. high 70 mm. diameter jar with the top closed with a screw-on cap having a 60.5 mm. diameter hole in it occupied by a 67.5 mm. diameter sample of the microporous material is used in an air-conditioned cabinet maintained at 37°±1°C. and at zero relative humidity by means of silica gel.

25 mm. of distilled water are placed within the jar and the change in weight $w$ in a specified time $t$ measured 4 hours after placing the jar in the cabinet and again at least 5 hours later is recorded. The water vapour permeability $$wvp = \frac{336.6 \, w}{t}$$

grams per square meter per hour at 100% RH and 37°C.

TABLE 4

| Example | 1A | | | 6A | | |
|---|---|---|---|---|---|---|
| | A | B | C | A | B | C |
| 100 | 4 | 6.4 | 6.4 | 1 | 1.7 | 1.7 |
| 75 | 5 | 7.9 | 1.5 | 1.6 | 2.7 | 1 |
| 50 | 5 | 7.9 | 0 | 1.6 | 2.7 | 0 |
| 25 | 5.5 | 8.7 | 0.8 | 2 | 3.4 | 0.7 |
| 20 | 6 | 9.5 | 0.8 | 3 | 5.0 | 1.6 |
| 17.5 | 6 | 9.5 | 0 | 3.3 | 5.6 | 0.6 |
| 10 | 8 | 12.7 | 3.2 | 30 | 50.4 | 44.8 |
| 6.4 | 40.5 | 64.3 | 51.6 | 41.5 | 69.8 | 19.4 |
| 5.0 | 49 | 77.8 | 13.5 | 45 | 75.7 | 5.9 |
| 3.2 | 55 | 87.3 | 9.5 | 47.5 | 79.8 | 4.1 |
| 2.0 | 57 | 90.5 | 3.2 | 49 | 82.4 | 2.6 |
| 1.6 | 57 | 90.5 | 0 | 50 | 84.1 | 1.7 |
| 1.0 | 58 | 92 | 1.5 | 51 | 85.7 | 1.6 |
| 0.8 | 59 | 93.7 | 1.7 | 51 | 85.7 | 0 |
| 0.75 | 59 | 93.7 | 0 | 52 | 87.4 | 1.7 |
| 0.5 | 60 | 95 | 1.3 | 53.5 | 89.9 | 2.5 |
| 0.4 | 60 | 95 | 0 | 55 | 92.4 | 2.5 |
| 0.2 | 62 | 98.4 | 3.4 | 58 | 97.5 | 5.1 |
| 0.1 | 62 | 98.4 | 0 | 59 | 99.2 | 1.7 |
| 0.075 | 62.3 | 98.9 | 0.5 | 59 | 99.2 | 0 |
| 0.05 | 63 | 100 | 1.1 | 59 | 99.2 | 0 |
| 0.035 | 63 | 100 | 0 | 59.5 | 100 | 0.8 |

Notes on Table 4

Column A is the % porosity of the sample due to pores greater than the value in microns given in the lefthand column. This includes both the pores and the voids with which the pores communicate.

Column B is the % of the total porosity which the value on the same line in Column A represents, e.g., for Example 1A, 4% of the porosity is due to pores greater than 100 microns and this represents 6.4% of the total porosity of 63% of Example 1.

Column C is the difference between the value on the line and the one in the line above for Column B and thus represents the % of total porosity which is due to pores between the value in that line and the one above, e.g., for Example 1A, 1.5% of the total porosity is due to pores which are greater than 75 microns but not greater than 100 microns.

Considering Table 3 in detail in Example 1A, 52% of the porosity is due to pores between 6.4 and 10 microns, 13.5% between 5.0 and 6.4, i.e., 65.5% between 5 and 10 microns and 9.5% between 3.2 and 5.0 microns, i.e., 75% between 3.2 and 10 microns; 68.3% is between 5.0 and 17.5 microns; the average pore diameter is 7.2 microns.

For Example 6A, 40% is between 12 and 17.5 microns, 5% is between 10 and 12 microns, i.e., 45% between 10 and 17.5 microns and 19% is between 6.4 and 10 microns, i.e., 64% between 6.4 and 17.5 microns; 70.1% is between 5.0 and 17.5 microns; the average pore diameter is 10 microns.

The examples described above are made on a porous polyethylene support.

One particular material suitable for use as the porous support which is both self supporting and has a degree of flexibility and gives a very good flesh surface appearance, is a porous liquid permeable sintered polymeric plastics material especially one made from high density polyethylene and preferably having an average pore size of 50 microns and more broadly 25 to 100 microns as measured by the method described in B.S.S. 1752: 1963 using n-propyl alcohol.

The porous polyethylene (or other suitable porous support which may be a tensioned woven belt and can be made of polymer or metal or combinations thereof) is very suitably one sold by Porvair Limited under the Trade Mark Vyon (filter grade).

This material is formed by spreading an even layer of Ziegler high density polyethylene powder on a smooth metal surface and then placing the smooth metal surface and the layer in a suitably heated oven to cause the particles to sinter. The surface of the resultant sintered sheet which was in contact with the smooth metal surface is smoother than the other face and it is on this smoother face that the layer is formed.

The porous support used in the Examples was a material of this sort having a permeability of 30 to 60 cubic feet of air/minute at a pressure of 2 inch static water guage.

The material in accordance with the present invention is preferably composed of elastomeric polyurethane and the invention is illustrated by use of a linear polyester based polyurethane of high elongation at break e.g. hundreds of percent such as at least 300, 500 or 700%.

The substrate itself also has a high elongation at break e.g. at least 200% and usually 300 to 500% or more.

However, many other polymers can be coagulated to porous form from solvent, and solvent/non solvent systems and it is believed that such other polymers could be formed into the novel product described herein. Further discussion of the polymer is given below.

The particular strength and wear characteristics required for the end use of the man made leather like material will determine the particular polymer formulation to be used for the substrate layer.

For shoe uppers high abrasion resistance and tear strength combined with a reasonable extensibility and initial modulus to provide proper wear comfort on the foot are required.

Many thermoplastic polymers can be used, for such purposes for example polyvinylchloride and its copolymers, acrylonitrile polymers and copolymers and polyurethanes or blends of one or more of these. However we prefer elastomeric polyurethanes.

The elastomeric polyurethane may be used on its own or as blends with minor proportions say up to 49% preferably less than 20% of polyvinyl chloride and other polymers and copolymers such as nitrile rubbers including solid copolymers of butadiene and acrylonitrile.

Other polymers which have been suggested for use in man made leather like materials include polyacetal resins, vinyl halide polymers (including copolymers with other ethylenically unsaturated monomers), polyamides, polyesteramides, polyesters, polyvinyl butyral, polyalphamethylstyrene, polyvinylidene chloride, polymers of alkyl esters of acrylic and methacrylic acids, chlorosulphonated polyethylene, copolymers of butadiene and acrylonitrile, cellulose esters and ethers polystyrene and other polymers made from monomers containing vinyl groups, and blends of them with elastomeric polyurethanes can be used.

The preferred polymer however are elastomeric polyurethanes having recovery properties intermediate between pure rubbers and pure thermoplastic materials at room temperature.

The article by Schollenberger Scott and Moore in "Rubber Chemistry and Technology" Vol. XXXV, No. 3, 1962 pages 742 to 752 at page 743 and in FIG. 3 indicates the long so-called half lives of the polyester urethanes made from adipic acid, 1,4 butane diol and diphenyl methane - p,p' - diisocyanate by the methods disclosed in U.S. Pat. No. 2,871,218 and sold under the Trade Mark ESTANE 5740. These two disclosures are incorporated herein by reference.

Polyurethanes may be based on a wide variety of presursors which may be reacted with a wide variety of polyols and polyamines and polyisocyanates. As is well known the particular properties of the resulting polyurethanes to a large extend can be tailored by suitable choice of the reactants, reaction sequence and reaction conditions.

The preferred polymers are elastomeric polyurethanes based on a linear, hydroxyl terminated polyester (although a polyether or a polyether/polyester blend may be used) and a diisocyanate with a small addition of a difunctional low molecular weight reactant. The last mentioned component may be added either with the other reactants at the start of a one-step polymerisation or at a later stage when it will act primarily as a chain extender.

This type of polyurethane having thermoplastic properties is particularly preferred for use in producing shoe uppers. Particularly preferred polyurethanes are those derived from polyesters by reaction with diols and diisocyanates. As is known from U.S. Pat. No. 2,871,218 mentioned above many different polyesters, diols and diisocyanates can be used, but a particularly suitable polyurethane system is one in which a polyester made from ethylene glycol and adipic acid is reacted with 1,4 - butylene glycol and with 4,4'-diphenylmethane diisocyanate.

In the system in accordance with the above specification the mole ratio of polyester and diol can vary between quite wide limits but the combined mole ratio of polyester and diol is arranged to be essentially equivalent to the mole ratio of diisocyanate so that the resultant polymer is essentially free of unreacted hydroxyl or isocyanate groups.

Polymers of this type but having an improved Shore hardness can be made by using a slight excess of diisocyanate and also by using a copolyester as by replacing part of the ethylene glycol in the above system by 1, -butylene glycol.

A further alternative polyurethane system which has been found particular suitable uses polyester derived from caprolactones. Such polyurethanes are described in British Pat. No. 859,640, the disclosure of which is incorporated herein by reference.

The polymers may be produced by a bulk polymerisation process and subsequently dissolved in suitable solvents or may be prepared directly in solution by a solution polymerisation process.

The polymers can include conventional stabilizers, fillers, processing aids, pigments, dyes additives and surface active agents for example proofing or wetting agents, and when the polymer content is quoted in the claims this includes any such additives which may replace up to 15% w/w of the polymer.

A particularly preferred polyurethane is that made by the novel solution polymerization process disclosed in U.S. Pat. Ser. No. 3709864 Belgian Pat. No. 742471 the disclosure of which is incorporated herein by reference. Such polyurethanes are characterised by having intrinsic viscosities in the range 0.9 to 1.4.

The intrinsic viscosity is determined in highly dilute solution in analytical grade DMF which has been thoroughly dried by storage under a nitrogen atmosphere over a molecular sieve (Linde 5A). Four measurements at 25°C corresponding to four, approximately equally spaced, concentrations are made and intrinisic viscosity and polymer solvent interaction parameter are determined by the Huggins equation:

$$\frac{\eta_{sp}}{C} = [\eta] + K'[\eta]^2 c$$

where $\eta_{sp}$ is the specific viscosity and C is concentration expressed in g/100 ml, and $\eta$ is the intrinsic viscosity.

For use in making shoe upper materials the preferred polyurethanes have melting points of at least 100°C preferably above 150°C (e.g. about 170 to 200°C, as measured by differential thermal analysis or differential scanning calorimetry). When formed into a smooth void-free thin film 0.2–0.4 mm in thickness (by carefully casting a degassed solution in dimethylformamide and then carefully evaporating off the solvent in a dry atmosphere) they have the properties described below; a tensile strength of at least 210 kilograms per square centimeter (preferably at least 350 e.g. about 420 to 600) a percent elongation at break of at least 300% (preferably at least 400%, e.g. about 500 or 700%) a 100% secant modulus (stress divided by strain at 100% elongation of at least 28 kilograms per square centimeter (preferably at least 84, e.g. about 110 to 134). These mechanical properties are measured by ASTM D882-67.

The preferred polyurethane (again, tested as a thin film made as described above) recovers completely from a 5% elongation at room temperature (23°C) but preferably does take on a permanent set (one measured for example as in an ASTM D412-66) after 100% elongation. This set is usually within the range of about 5 to 20%, as in the range of about 10 to 20%, e.g. about 15%. The "permanent set" is usually measured an hour after the release of stress; for example, a material which shows a tension set of some 24–26% immediately on release of the clamps after being held at the 100% elongation for 10 minutes will have a tension set of 14% measured 1 hour after the release of the clamps. (In the measurement a film specimen 1 cm wide with a gauge length of 5 cm is strained to the 100% elongation at a rate of 254% per minute). Preferably the material for the substrate layer has a Shore hardness of at least 75A (more preferably about 90A to 60D), measured by ASTM D1706-67.

The use of polar organic solvents has been mentioned.

Many polar organic solvents could be used but DMF is preferred.

The particular solvent which is used can vary depending on the particular polymer composition non solvent and removable filler which are being used. The solvent should not react with the other components of the system although it can form complexes with the non solvent e.g. hydrates when the non solvent is water as is believed to be the case with DMF. Also the solvent must be miscible with the non solvent, preferably completely so, and must be able to be extracted from the coagulated polymer.

Solvents which could be used instead of DMF include amides, esters, ketones, sulphones, and phenols, however preferred alternative solvents to DMF are dimethyl sulphoxide, N-methyl pyrrolidone, and dimethyl acetamide and blends thereof with cheaper solvents such as toluene and xylene which although not solvents for the polyurethane on their own do not act as non solvents when mixed with dimethylformamide.

The non solvent to be used will also vary depending on the particular polymer composition, solvent and removable filler which are being used. Again the non solvent should be chemically inert to the polymer and removable filler though it may be a solvent for the removable filler and may form complexes with the solvent. The non solvent should be miscible with the solvent and should be a non solvent for the polymer, i.e, when added in excess to a solution of the polymer it should coagulate the polymer.

Suitable inert non solvent liquids include methanol, ethanol, water, hydrocarbons such as benzene, toluene, chlorinated hydrocarbons, such as tetrachloroethylene and chloroform, polyols such as ethylene glycol, glycerol, and 1,1,1,-trimethylolpropane and glycol monoalkyl ethers and mixtures thereof which are miscible with the solvent. However, the preferred non solvent is water since it presents no recovery problems and is far cheaper than any of the alternatives and moreover since it is a very good solvent for the preferred removable fillers, namely, inorganic salts such as sodium chloride, it can also be used as the non solvent for the actual coagulation step of the process.

The removable filler is preferably a water soluble solid or a solid which can be dissolved by a non solvent compatible with the polymer. The removable filler could be one, e.g., a carbonate or bicarbonate, which can be removed by chemical action of the coagulating non solvent, e.g., a dilute aqueous acid or by thermal decomposition, e.g., ammonium carbonate or bicarbonate but it should be chemically inert during the actual coagulation stage to ensure that no gas bubbles are produced in the coagulated microporous structure. Whilst such alternatives are possible they add complications to the process and are not preferred.

The preferred removable fillers are water soluble inorganic salts e.g. the alkali metal and alkaline earth metal and ammonium salts e.g. chlorides and sulphates or nitrates, especially sodium and potassium chlorides and sulphates and ammonium sulphate, sodium chloride being preferred on grounds of cheapness, relative solubilities, and ease of availability.

It has been mentioned above that the topcat and fleshcoat layers are integrally adhered to the substrate.

As can be seen from an inspection of the photomicrographs, this adherence is not produced by a more dense layer at the interface between the layers but rather the walls between the voids continue unmodified apart from a change in wall thickness from one layer to the other. This desirable highly permeable structure results from the preferred simultaneous coagulation technique whereby all three layers are deposited prior to any coagulation and then the unitary structure is exposed to the coagulant.

The topcoat, as mentioned above, is preferably given a finishing treatment. The preferred form of this treatment involves the formation of a thin densified but still permeable zone at the outer surface of the topcoat layer. This densified layer is normally for grain leather-like products not more than 30 microns thick and is usually less than 20 microns thick, e.g. 1 to 15 or 3 to 10 microns thick.

The surface of the material when finished by the technique described above has the following general characteristics when examined microscopically. It has a thin fused surface layer typically 1 to 15 microns thick with fewer pores penetrating its surface than the untreated material, i.e., less than about 300 pores visible at 200x magnification in an area 360 microns by 360 microns.

The material typically has less than 200 pores, e.g. not more than 100, e.g., 10 to 100, and mostly 30 to 70, e.g., about 50 visible at 200x magnification in an area 430 microns by 430 microns. These pores are located in shallow craters typically 5 to 20, e.g. 10 microns deep and 20 to 90, e.g. 50 microns wide. The pores in the bottom of a crater typically have a bridged appearance providing access to a number of pores in the interior of the material. The pores which remain are typically 5 to 30, e.g., about 20 microns in diameter and are thus generally larger than the pores in the unsprayed material.

Each crater may contain a number of such pores typically 3, 5, 6, 8 or 10.

All the materials made by these techniques have a good grain break or crease pattern exhibiting a fine pattern of creases at the line of the fold when the material is folded sharply with the topcoat on the inside of the fold.

What we claim as our invention and desire to secure by Letters Patent is:

1. A water vapour permeable soft flexible sheet material suitable for use as the upper of a shoe in place of leather, said sheet material being at least 0.8 mm. thick and up to 2.0 mm thick, being free from fibrous reinforcement, and having an elongation at break in excess of 200%, comprising a strength imparting porous elastomeric polymer substrate layer disposed between a porous elastomeric polymer fleshcoat layer and a porous elastomeric polymer topcoat layer, the substrate layer having a higher density than the fleshcoat or topcoat layers and being thicker than either the fleshcoat or the topcoat layers the thickness of each of said fleshcoat and topcoat layers being 10 to 95% of the thickness of said substrate layer and the combined thickness of the fleshcoat and topcoat layers being in the range 30% to 175% of the thickness of the substrate layer.

2. A material as claimed in claim 1 in which the strength imparting porous elastomeric polymer substrate layer has compact voids randomly distributed through the layer intercommunicating via pores penetrating the walls between the voids, and the fleshcoat layer is microporous having compact voids randomly distributed through the layer intercommunicating via pores penetrating the walls between the voids, the topcoat layer is microporous having compact voids randomly distributed through the layer intercommunicating via pores penetrating the walls between the voids, and the substrate is characterised by having wall thicknesses between the voids generally greater than those in the fleshcoat or the topcoat.

3. A material as claimed in claim 1 further characterised by having a cut tear strength as defined herein of at least 1.5 kg. and a ratio of cut tear strength to stiffness as defined herein of at least 4.2.

4. A material as claimed in claim 1, in which the substrate layer consists of a porous matrix of elastomeric polymer affording a plurality of compact voids intercommunicating by pores, the said substrate layer being from 0.5 to 1.5 mm. thick and having a total void volume or porosity in excess of 50% and at least 65% of the porosity being provided by pores and the voids with which the said pores interconnect, the said pores having diameters of at least 5.0 microns and not more than 20 microns as determined by mercury intrusion pentrometry.

5. A material as claimed in claim 1, in which the fleshcoat and topcoat are integrally adhered to the substrate layer.

6. A material as claimed in claim 1 in which the substrate polymer is a polyester based polyurethane material having a Shore hardness of 75A to 60D as a solid continuous sheet at 25°C., and in which the polyurethane polymers used for the fleshcoat and for the topcoat are polyester or polyether polyurethanes having a lower Shore hardness than the substrate polyurethane.

7. A material as claimed in claim 1 in which the substrate layer has a porosity in the range 50 to 65% and less than 7% of the total porosity is provided by pores and the voids with which they interconnect the said pores having diameters in excess of 100 microns and at least 50% of the total porosity is provided by pores and the voids with which they interconnect the said pores having diameters in the range 6.4 to 17.5 microns.

8. A material as claimed in claim 1 in which the substrate layer when a cut cross-section is viewed is further characterised by compact voids the majority of which have maximum dimensions in the plane of the cross-section of 30 to 100 microns, the majority of these voids having shortest transverse dimensions in the plane of the cut surface of ¼ their maximum dimension and above, the shapes of the voids being non-spherical and though irregular in outline compact in shape, the voids being separated by more dense regions which contain smaller pores visible at 150-fold magnification the majority of which are 1 to 30 microns across and spaced apart by 1 to 10 microns the majority of these denser regions being of 30 to 100 microns across between adjacent larger voids.

9. A material as claimed in claim 1 in which the fleshcoat and topcoat layers are microporous and when a cut cross-section is viewed are characterised by irregular shaped though compact voids from 5 to 75 microns across the majority being 20 to 50 microns across the said voids being defined or surrounded by thin walls 1 to 5 microns thick the voids intercommunicating by pores passing through these thin walls.

10. A material as claimed in claim 1 in which the substrate polymer as a thick void free film 0.2 to 0.4 mm. thick has a modulus at 25% extension of at least 55 kg/cm$^2$ and the fleshcoat and topcoat polymers as a thin void free film 0.2 to 0.4 mm. thick have a modulus at 25% extension of less than 55 kg/cm$^2$.

11. A process for making a water vapour permeable soft flexible material suitable for use as the upper of a shoe in place of leather which comprises depositing a layer of coagulable elastomeric polymer fleshcoat composition on a porous support to form the fleshcoat layer, prior to coagulation depositing a layer of coagulable elastomeric polymer substrate composition on top of the layer of fleshcoat composition and a layer of coagulable elastomeric topcoat composition on top of the layer of substrate composition, and then coagulating the composite material to an integrally adhered microporous three-layer structure free from fibrous reinforcement, at least the substrate composition and at least one of the fleshcoat or topcoat compositions containing a removable particulate filler, the filler in the said fleshcoat or topcoat compositions having an average particle size smaller than that used in the substrate composition, said compositions being such and being deposited in such thickness as to produce a product which is 0.8 to 2.0 mm thick, free from fibrous reinforcement, and having an elongation at break in excess of 200%, comprising a strength imparting porous elastomeric polymer substrate layer disposed between a porous elastomeric polymer fleshcoat layer and a porous elastomeric polymer topcoat layer, the substrate layer having a higher density than the fleshcoat or topcoat layers and being thicker than either the fleshcoat or the topcoat layers the thickness of each of said fleshcoat and topcoat layers being 10 to 95% of the thickness of said substrate layer and the combined thickness of the fleshcoat and topcoat layers being in the range 30 to 175% of the thickness of the substrate layer.

12. A process as claimed in claim 11 in which the substrate composition comprises an elastomeric polyurethane dissolved in a polar organic solvent at 25 to 40% by weight concentration with a particulate dissolvable filler dispersed therethrough, which is substantially insoluble in the organic solvent, and the filler has an average particle size as determined by Coulter counter measurements in the range 20 to 200 microns and the ratio of filler to polymer is in the range 1.8 : 1 to 2.7 : 1 parts by weight and the flesh and topcoat compositions contain dispersed filler having an average particle size below 20 microns.

13. A shoe or other article of footwear having a place of the upper leather thereof a material as claimed in claim 1.

14. A process as claimed in claim 13 in which the substrate composition comprises an elastomeric polyurethane dissolved in a polar organic solvent at 25% to 40% by weight concentration with a particulate dissolvable filler dispersed therethrough, which is substantially insoluble in the organic solvent, and the filler has an average particle size as determined by Coulter counter measurements in the range 20 to 200 microns and the ratio of filler to polymer is in the range 1.8:1 to 2.7:1 parts by weight and the flesh and topcoat compositions contain dispersed filler having an average particle size below 20 microns.

15. A process as claimed in claim 14 in which the substrate composition comprises a 30–35% by weight solution of polyurethane containing 1.9:1 to 2.2:1 parts by weight microscopic removable filler per part of polymer and the top coat and fleshcoat compositions comprise a 25% by weight solution of polyurethane containing 3 parts by weight of microscopic removable filler per part of polymer.

16. A process as claimed in claim 15 in which the average particle size of the removable filler in the substrate composition is in the range 25 to 50 microns.

* * * * *